Patented Dec. 6, 1932

1,889,932

UNITED STATES PATENT OFFICE

EMMERICH v. PONGRATZ, OF OPPAU, AND HERMANN ZORN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF OILS FROM INDUSTRIAL RESIDUES

No Drawing. Application filed February 14, 1929, Serial No. 340,010, and in Germany April 23, 1928.

This invention relates to improvements in the recovery of oils from industrial residues.

We have found that the hitherto worthless oil-bearing residues containing metal halides which are obtained from the treatment of all kinds of hydrocarbons, such as mineral oils, tar oils, olefines and the like, with metal halides, for example the anhydrous chlorides of aluminium or iron, or with a metal, such as iron or aluminium, and halogen hydride, which latter treatment is considered to be an equivalent of the treatment with metal halides for the purposes of the present invention, as for example, the residues resulting from the refining, condensation or cracking of hydrocarbons in the presence of the said agents can be worked up into valuable oils by dry distillation, with an addition of substances, which are ordinarily solid, which have a basic nature and, if desired, also a desulphurizing action, such as calcium carbonate or other basic salts, basic lead salts or oxides, iron oxide or the like, either singly or in conjunction with one another. In order to obtain valuable oils from the residues to be worked up according to the present invention, these residues are subjected in admixture with the said substances having a refining action to dry distillation at the usual temperature for this process.

Substances having a basic nature have a refining action by reason of the fact that the said oily residues are extensively freed by them from hydrogen chloride usually present in the said oils. Hydrogen chloride often has a very injurious effect on the oils, and also has the drawback that the vapours thereof evolved in the recovery of oils or aluminium chloride from the oily residues corrode the reaction vessels to a considerable extent. These inconveniences are overcome by the addition of basic substances and thus it is made possible to obtain valuable oils from otherwise worthless residues.

The process according to the present invention is especially suitable for the recovery of oils from the residues obtained in the production of lubricating oils which are produced by subjecting the middle fractions of mineral oils or tar oils and gaseous olefines to the action of metal halides. The said residues are formed by condensation and polymerization of a part of the oils to be worked up into lubricating oils with the gaseous olefines and the metal halide employed; they contain considerable amounts of hydrocarbons and can not be freed from the metal halide probably on account of the fact that water formed in the previous condensing reactions from oxygen containing compounds is present in considerable amounts and can only be distilled off at high temperatures, at which it decomposes the metal halide.

The simple dry distillation of the waste products containing metal halides, without any additions, furnishes an oil which is strongly acid, and often malodorous, but the employment of the said additions results in higher yields and in a pale, odorless oil, which can be either used as a heating oil, or be treated, after fractionation, for the production of light, middle and lubricating oils.

The said dry distillation may also be carried out with a simultaneous introduction of extraneous gases or vapors, such as steam, nitrogen, hydrogen and the like or under reduced pressure or both. In some cases elevated pressure may also be employed.

The following example will further illustrate the nature of the invention which, however, is not limited thereto. The parts are by weight.

*Example*

1000 parts of a residue obtained in the treatment of brown coal tar oil with aluminium chloride are intimately mixed with 260 parts of powdered calcium carbonate, and are subjected to dry distillation in the presence of a current of nitrogen. No frothing of the residue occurs. 42 parts of first runnings, 148 parts of pale middle oil and 415 parts of pale lubricating oil distillate are obtained making in all 605 parts of oil with reference to the initial material. If the dry distillation is carried out without an addition of calcium carbonate, only about 400 parts of a very malodorous product which soon becomes dark-colored on exposure to air is obtained.

In the above example other substances, such as basic salts, such as basic lead salts or oxides, such as iron oxide or the like may also be employed either singly or in conjunction with one another in place of or together with calcium carbonate.

What we claim is:—

1. A process for the recovery of oils from oil-bearing residues which are substantially free from low boiling hydrocarbons and which are obtained from a previous treatment of hydrocarbons with a metal halide, which comprises subjecting the said residues containing said metal halide to dry distillation with an addition of a substance having a basic action.

2. A process for the recovery of oils from oil-bearing residues which are substantially free from low boiling hydrocarbons and which are obtained from a previous treatment of hydrocarbons with a metal halide, which comprises subjecting the said residues containing said metal halide to dry distillation with an addition of a solid substance having a basic action.

3. A process for the recovery of oils from oil-bearing residues obtained from the treatment of hydrocarbons with a metal halide, which comprises subjecting the said residues containing said metal halide to dry distillation with an addition of a solid substance having a basic action and with simultaneous introduction of inert scavenging gases.

4. A process for the recovery of oils from oil-bearing residues obtained from the treatment of a brown-coal tar oil with aluminium chloride and subsequent distillation, which comprises subjecting the said residue containing metal halide to dry distillation with an addition of calcium carbonate in the presence of a current of nitrogen.

5. A process for the recovery of oils from oil-bearing residues which are substantially free from low boiling hydrocarbons and which are obtained from a previous treatment of a middle oil and gaseous olefines with a metal halide, which comprises subjecting the said residues containing metal halide to dry distillation with an addition of a substance having a basic action.

6. A process for the recovery of oils from oil-bearing residues obtained from the treatment of a middle oil and gaseous olefines with a metal halide, which comprises subjecting the said residues containing metal halide to dry distillation with an addition of calcium carbonate in the presence of a current of nitrogen.

In testimony whereof we have hereunto set our hands.

EMMERICH v. PONGRATZ.
HERMANN ZORN.